US006865518B2

(12) United States Patent
Bertrand et al.

(10) Patent No.: US 6,865,518 B2
(45) Date of Patent: Mar. 8, 2005

(54) METHOD AND DEVICE FOR CLASSIFYING VEHICLES

(75) Inventors: Jean Bertrand, Les Ponts de Ce (FR); Mamadou Dicko, Bondoufle (FR)

(73) Assignees: Laboratoire Central des Ponts et Chaussees, Paris (FR); Alcatel, Paris (FR)

( * ) Notice: Subject to any disclaimer, the term of this patent is extended or adjusted under 35 U.S.C. 154(b) by 5 days.

(21) Appl. No.: 10/332,665

(22) PCT Filed: Jul. 13, 2001

(86) PCT No.: PCT/FR01/02292

§ 371 (c)(1), (2), (4) Date: Jan. 10, 2003

(87) PCT Pub. No.: WO02/07126

PCT Pub. Date: Jan. 24, 2002

(65) Prior Publication Data

US 2003/0163263 A1 Aug. 28, 2003

(30) Foreign Application Priority Data

Jul. 13, 2000 (FR) ............................................ 00 09189

(51) Int. Cl.[7] ................................................ G06F 19/00

(52) U.S. Cl. ........................ 702/189; 702/187; 702/188; 702/190

(58) Field of Search .......................... 702/65, 142, 150, 702/155, 187–190, 167; 235/454; 372/101; 701/23, 35

(56) References Cited

U.S. PATENT DOCUMENTS

| | | | | |
|---|---|---|---|---|
| 5,757,288 A | | 5/1998 | Bracht | 340/941 |
| 6,052,068 A | * | 4/2000 | Price R-W et al. | 340/933 |
| 6,614,387 B1 | * | 9/2003 | Deadman | 342/70 |
| 2003/0042304 A1 | * | 3/2003 | Knowles et al. | 235/384 |

FOREIGN PATENT DOCUMENTS

| | | |
|---|---|---|
| EP | 0 089 030 A | 9/1983 |
| GB | 1 205 036 A | 9/1970 |
| WO | WO 95 28693 A | 10/1995 |

* cited by examiner

*Primary Examiner*—Marc S. Hoff
*Assistant Examiner*—Felix Suarez
(74) *Attorney, Agent, or Firm*—Weingarten, Schurgin, Gagnebin & Lebovici LLP

(57) ABSTRACT

A device for obtaining vehicle electromagnetic signature data from electromagnetic signals includes means (16) for obtaining a digitized signal from measured electromagnetic signals. The device further includes means (20) for determining if a digitized signal is a vehicle electromagnetic signature signal. The means (20) then calculate electromagnetic signature data of a vehicle from the digitized signal, and time-stamp each data point of the electromagnetic signature. Vehicles can therefore be classified in accordance with several criteria by specific processing of the digitized electromagnetic signature signals.

36 Claims, 12 Drawing Sheets

Signature of a CLIO crossing the center of Loop 0

METHOD AND DEVICE FOR CLASSIFYING VEHICLES

TECHNICAL FIELD AND PRIOR ART

The invention relates to the field of techniques for collecting road traffic data and in particular for counting and/or classifying automotive vehicles as they travel along a roadway, for example an expressway.

The invention relates in particular to a method and to a device for classifying vehicles into silhouette categories on the basis of their electromagnetic signatures.

It also relates to the field of road traffic management.

At present electromagnetic loop sensors are used to analyze road traffic. They have the advantage of being simple and rugged.

As shown in FIG. 1, a measurement point on a traffic lane includes two or more electromagnetic loops 2, 4. Each loop comprises a few turns (generally three or four turns) of conductive wire disposed in the roadway to form a coil and is installed in a groove a few centimeters deep.

Each coil formed in this way generally has an inductance of the order of 100 microhenries ($\mu$H).

When a coil is excited by an alternating current (AC) voltage at a frequency of the order of 30 kilohertz (kHz) to 150 kHz a magnetic field proportional to the inductance of the coil and to the current flowing in it is created.

If a metal mass enters the field, induced currents modify the field and consequently vary the self-inductance of the coil. This inductance variation phenomenon is detected by a detector 6. It can be detected by measuring variation in phase, amplitude, frequency or impedance.

With the detectors known in the art that are usually employed, as soon as a vehicle is present over the loop there is available at an output a logic signal corresponding to the time for which the vehicle is present over the loop. This logic signal appears as soon as the relative self-inductance variation $\Delta L/L$ exceeds the sensitivity threshold of the detector.

In fact, vehicles can be counted and a vehicle flowrate determined with a single sensor in each traffic lane. However, it is also possible to measure the time for which vehicles are present (i.e. located over the sensor) and to express an occupancy rate.

Information on vehicle speed and length is obtained if two offset sensors are installed on the same traffic lane, generally with a distance of 3 m between their leading edges. It is therefore possible to distinguish between long vehicles and short vehicles.

However, that classification, which is sometimes used in some applications to discriminate between vehicle categories, remains highly approximate and relatively imprecise. For example, cars towing a caravan or a small trailer are classified as heavy trucks.

Moreover, it is not possible to use a classification comprising more than six length categories.

If a more refined classification is required, for example into 14 silhouette categories, it is necessary to add a third sensor to the two above-mentioned loops, the third sensor having the function of detecting vehicle axles as vehicles pass it.

That additional sensor is generally a piezo-electric cable.

Sometimes a special narrow loop with the same functions is used instead of a piezo-electric cable.

That type of device yields classification results that are generally satisfactory for road operators, but is costly. A site of that kind is more or less equivalent, in terms of cost (including roadworks and detectors), to three sites equipped to evaluate vehicle speeds.

Consequently, in existing installations, to meet the requirements of collecting road traffic data using loop technology it is necessary to combine a plurality of sensors in each lane, leading to a non-negligible additional implementation cost for each measurement point.

Systems employing capacitive sensors have been used, in particular in Great Britain, but still in association with a pair of electromagnetic loops, which does not solve the cost problem.

SUMMARY OF THE INVENTION

The problem therefore arises of finding a data processing device that is highly reliable and simpler than the systems known in the art.

There also arises the problem of finding a device achieving great accuracy in respect of the electronic signatures of vehicles.

There further arises the problem of finding a device for detecting the category of a vehicle accurately that is reasonable to implement and of reasonable cost.

The invention firstly provides a signal processor device for obtaining vehicle electromagnetic signature data from electromagnetic signals, the device comprising:

means for obtaining a digitized signal from the electromagnetic signals, means for determining if a digitized signal is a vehicle electromagnetic signature signal, and means for calculating electromagnetic signature data of a vehicle from the digitized signal, and for sequencing and time-stamping each electromagnetic signature data point in synchronized and real-time manner.

Thus the device of the invention measures the electromagnetic signature of a vehicle to deduce therefrom digitized, sequenced, and time-stamped data.

Each digital sample is therefore associated with a time or with an identified time value.

The invention sequences and time-stamps each electromagnetic signature signal and each data point thereof in a synchronized manner.

Thus the invention accurately time-stamps the passage of each vehicle, i.e. it associates a time and date with each electromagnetic signature data point.

Furthermore, the device includes means for determining whether a signal received corresponds to a vehicle signature or merely consists of noise.

The device of the invention uses only one loop in each road lane. No additional loop is needed. One loop in each lane is sufficient for measuring vehicle flowrate, occupancy rate, speed, vehicle intervals, distances between vehicles, and silhouette category, for example. In the case of two juxtaposed lanes, two loops can be used, but with only one loop in each lane.

With a single loop, the device of the invention identifies the silhouette categories of vehicles and/or measures the speeds of vehicles.

Moreover, a device of the above kind is compatible with existing installations using standard detector loops, which avoids additional roadworks costs.

The invention also provides a system for acquiring vehicle electromagnetic signature data, the system comprising:

a single electromagnetic loop, and a device of the invention, as defined hereinabove, for processing electromagnetic signals from the loop.

The invention further provides a signal processing device or a data acquisition system of the invention as defined hereinabove and further comprising classification means for classifying vehicles into two or more categories as a function of sequenced and digitized electromagnetic signature signals or data.

The classification means that process the electromagnetic signature signals work through decision trees.

Thus a robust classification is obtained. Moreover, this type of classification is compatible with a number of categories greater than six, for example 14 categories.

The invention further provides a vehicle electromagnetic signature signal processing method comprising:

producing time-stamped, sequenced and digitized electromagnetic signature signals, and classifying vehicles into two or more categories as a function of the time-stamped, sequenced and digitized electromagnetic signature signals.

A device, a system and a method of the invention use a procedure for processing the electromagnetic signature of a vehicle which in particular identifies the silhouette category of the vehicle in a classification profile accommodating 14 silhouettes.

They also estimate the speed of the vehicle as it passes over the sensor from the sequenced and digitized data and using only one sensor in each traffic lane.

A single conventional loop in each traffic lane is sufficient to generate the main road traffic parameters, and in particular: vehicle flowrate; occupancy rate; distances between vehicles; speeds of vehicles; lengths of vehicles; and silhouette categories of vehicles.

Finally, the invention further provides a method for generating a program for classifying vehicles into two or more predetermined categories as a function of digitized signals representative of electromagnetic signatures of said vehicles, said method comprising:

processing said signals in the time domain to produce a first set of digitized data, processing said signals in the frequency domain to produce a second set of data containing the harmonic characteristics of said signals, making a first random selection of n data points from the data in the first and second sets, generating a first decision tree for classifying the vehicles into said predetermined categories as a function of the n data points obtained during the first random selection of data, making one or more second random selections of n data points from the data in the first and second sets, and generating one or more second decision trees for classifying the vehicles into said predetermined categories as a function of the n data points obtained during the second random selection of data.

A method of the above kind generates decision trees that can be used in a system and a method of the invention as defined hereinabove.

The random selection of data can be repeated, and a tree can be generated for each selection. Five, ten or even 30 trees can be generated in this way.

A classification method of the invention that is particularly advantageous because it classifies vehicles into 14 categories uses thirty decision trees determined in the above manner.

BRIEF DESCRIPTION OF THE DRAWINGS

The features and advantages of the invention become more apparent in the light of the following description, which relates to embodiments provided by way of explanatory and non-limiting example and refers to the accompanying drawings, in which.

DETAILED DESCRIPTION OF EMBODIMENTS OF THE INVENTION

Figure 2:
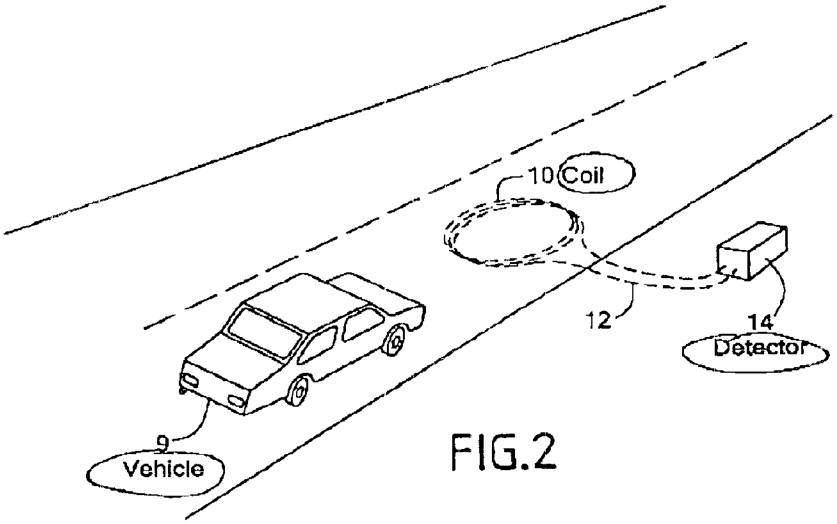
FIG. 2 shows a loop sensor structure of the invention for a vehicle flowrate/speed measurement point on a traffic lane.

FIG. 2 shows a loop sensor structure of the invention. A single loop 10 or a single loop sensor is disposed in or on a vehicular traffic lane.

As already explained hereinabove, an electromagnetic loop sensor comprises a few turns (generally three or four turns) of conductive wire disposed in the roadway to form a coil.

The loop sensor constitutes the inductive portion of an oscillator.

In the case of long-term installations, the loop sensor is installed in a groove a few centimeters deep, generally forming a rectangle 2 meters (m)×1.50 m and a twisted pair cable 12 a few tens of meters long connects it to a detector unit 14. Other loop geometries and sizes can equally well be used, such as the circular geometry shown in FIG. 2.

With the configuration shown in the example, the coil formed in this way has an inductance of the order of 100 $\mu$H. The value of the loop takes account of the tuning range of the detector.

When the detector to which it is connected is switched on, the loop sensor 10 produces a magnetic field proportional to the inductance of the coil and to the current flowing in it.

If a metal body passes over the loop, induced currents modify the field and consequently vary the self-inductance of the coil.

The inductance variation is called an electromagnetic signature and depends on the metal structure of the moving body and its height relative to the plane of the loop in the ground.

Figure 3:
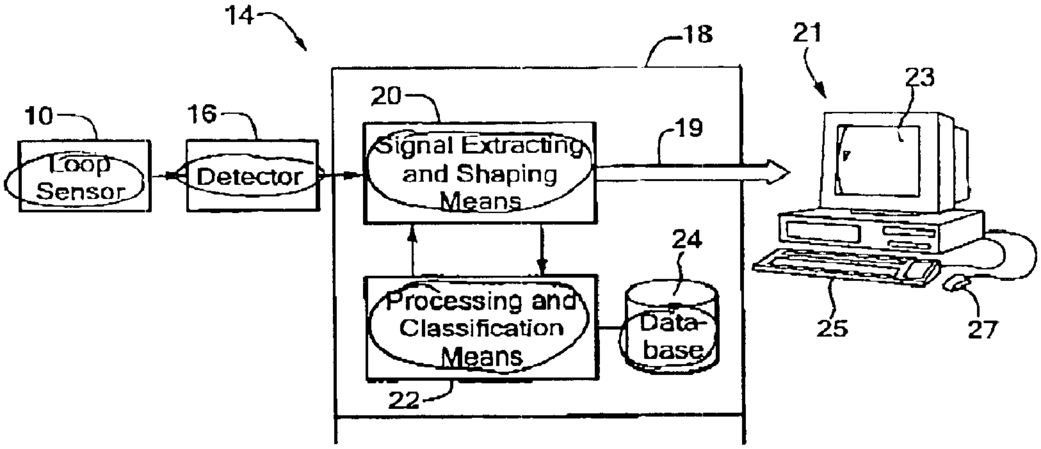
FIG. 3 is a block diagram of a detector and processor system of the invention.

FIG. 3 shows the structure of a device of the invention for extracting and processing a signal.

A device of the above kind produces, digitizes, sequences and time-stamps an electromagnetic signature. This produces in real time an electromagnetic signature for processing.

The digitized signal comprises all of the digital values reflecting the analog changes in the amplitude of the signal. Time-stamping gives the time and date of the signature event.

Finally, sequencing the signal corresponds to matching each digitized signal sample value with the respective measuring time value.

The detector unit 14 includes detector means 16 or detectors and processor means 18 for processing the detected signals, such as one or more microcomputer CPU cards.

The processor means 18 in turns include signal extracting and shaping means 20 and processing and classification means 22.

All of the above means produce on a data bus 19 a signal or signals representative of traffic data.

A signature database 24 can also be constructed.

In one embodiment, the detector 16 includes an internal oscillator associated with the loop 10.

The variations in the inductance of the loop 10 when a vehicle 9 passes over it modify the frequency of the internal oscillator.

In fact, the resulting variations in the signal are the instantaneous resultant of opposing effects caused by the metal body passing over the loop:

a) the effect of currents induced in the metal body crossing the magnetic field around the loop, which increases the frequency and reduces the measured apparent inductance L, and b) the effect of a core in an inductor coil (for example when axles and wheels pass over it), which reduces the frequency and increases the apparent inductance L.

A digital (microprocessor-based) detector counts the number of periods of the internal oscillator to determine its frequency variations.

The equivalent inductance variation can be deduced therefrom, for example using the following equation, in which ReadValue is the value given by the detector each time the loop signal is read (the read value is proportional to the frequency variation) and FACT is a factor that depends on the sensitivity setting of the detector:

$$\Delta L/L = \text{ReadValue} \times \text{FACT} \times 1000 \quad (1)$$

The detector 16 is a standard detector which performs analog-to-digital conversion on the internal oscillator frequency variation signals. In one embodiment, it supplies:

a binary logic signal that corresponds to the variation produced by the presence of a vehicle over the loop and is a function of the detection threshold of the detector and the time for which the vehicle is present in the detection area, and the frequency variation induced by the passage of a vehicle, which is hereafter expressed as a relative inductance variation ΔL/L.

The detector can communicate with an external system via a serial or parallel link.

A detector device is preferably chosen which can:

detect a vehicle traveling very slowly (slower than 1 kilometer per hour (kph) or very fast (faster than 250 kph) with a response time less than 100 milliseconds (ms), and detect variation ΔL/L of the order of 0.01%, still with good immunity to electrical noise.

On request, the detector supplies information for determining or calculating particular parameters, including the sensitivity setting, the oscillator frequency, the loop inductance, and finally its state (detection or idle).

In one embodiment, the detector is a standard PEEK MTS38Z detector, uses a serial link, and is associated with means programmed or specially programmed to process and exploit the signals.

The above example relates to a detector which supplies a frequency variation signal from which the electromagnetic signature can be deduced. In other embodiments the signature can be obtained from phase, amplitude or impedance variations.

The extractor means 20 cyclically interrogate the detector 16, which responds by supplying the oscillator frequency (or phase, amplitude, or impedance) variation information which is used to calculate the relative variation ΔL/L.

Figure 4:
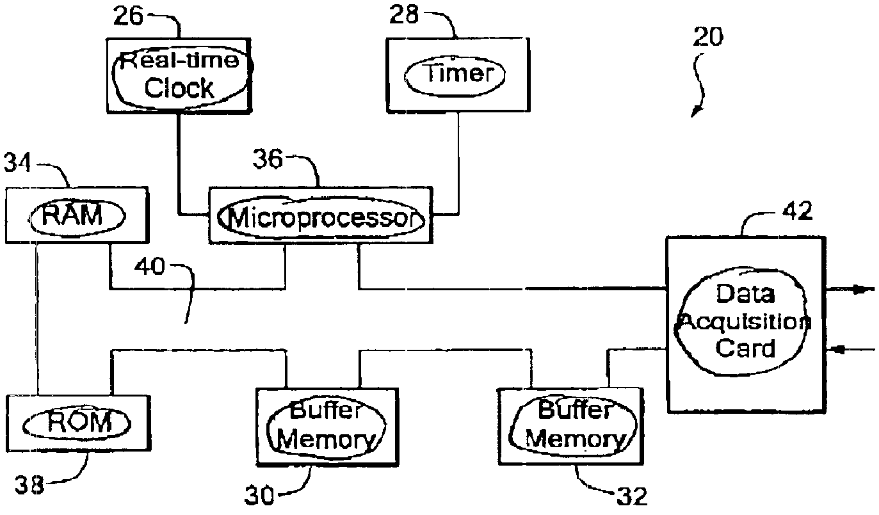
FIG. 4 shows in more detail signal extractor and shaper means of a device of the invention.

FIG. 4 is a block diagram of the means 20 (for example a programmed CPU card) that calculate the variations ΔL/L and filter and time-stamp them and store them in memory.

The means 20 include a microprocessor 36, random access memories (RAM) 34 for storing data, and a read-only memory (ROM) 38 for storing program instructions.

A data acquisition (input/output interface) card 42 formats the data supplied by the detector to the format required by the card 20.

Data or instructions for processing data in accordance with the invention, and in particular for calculating the variations ΔL/L, are loaded into the means 20, and in particular into the memory 36.

The data or instructions for processing data can be transferred into the memory area 36 from a diskette or any other medium that can be read by a microcomputer or a computer (for example: hard disc, ROM, dynamic RAM (DRAM) or any other type of RAM, optical compact disc, magnetic or optical storage element).

The means 20 are further provided with a real time clock 26, a timer 28, and buffer memories 30, 32.

The clock and the timer are synchronized, so that each data point can be associated with a signature signal at a precise time (depending on the accuracy of the timer). In other words, the time-stamping and sequencing functions are well synchronized, which makes the system highly accurate, in fact as accurate as the timer.

One of the memories is a circulating buffer which temporarily stores the latest signal data corresponding to a duration t1, which is of the same order of magnitude as the response time of the detector used.

Using the data corresponding to a duration t1, it is possible to detect if a signal is a signature signal associated with the passage of a vehicle, for example by detecting a previously determined threshold value.

If a signature signal is detected that is in fact associated with the passage of a vehicle, the remainder of the signal is stored in the memory 32. The remainder of the signal relates to later or subsequent signal data corresponding to times after t1.

Figure 1:
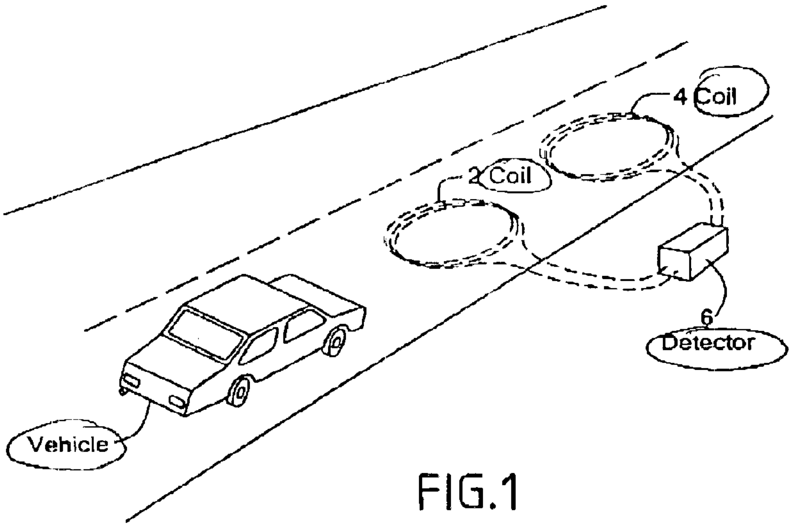
FIG. 1 shows a prior art loop sensor structure for a vehicle flowrate/speed measurement point on a traffic lane.

All of the above data can then be recovered in a memory 34 or transferred for processing to form the electronic signature in digitized and sequenced form: each value of ΔL/L is associated with the corresponding value from the timer. This eliminates the need for an additional sensor to detect the passage of a vehicle, which simplifies the measuring device, since it requires only one loop 10 and no additional sensor (FIG. 1).

Figure 5:
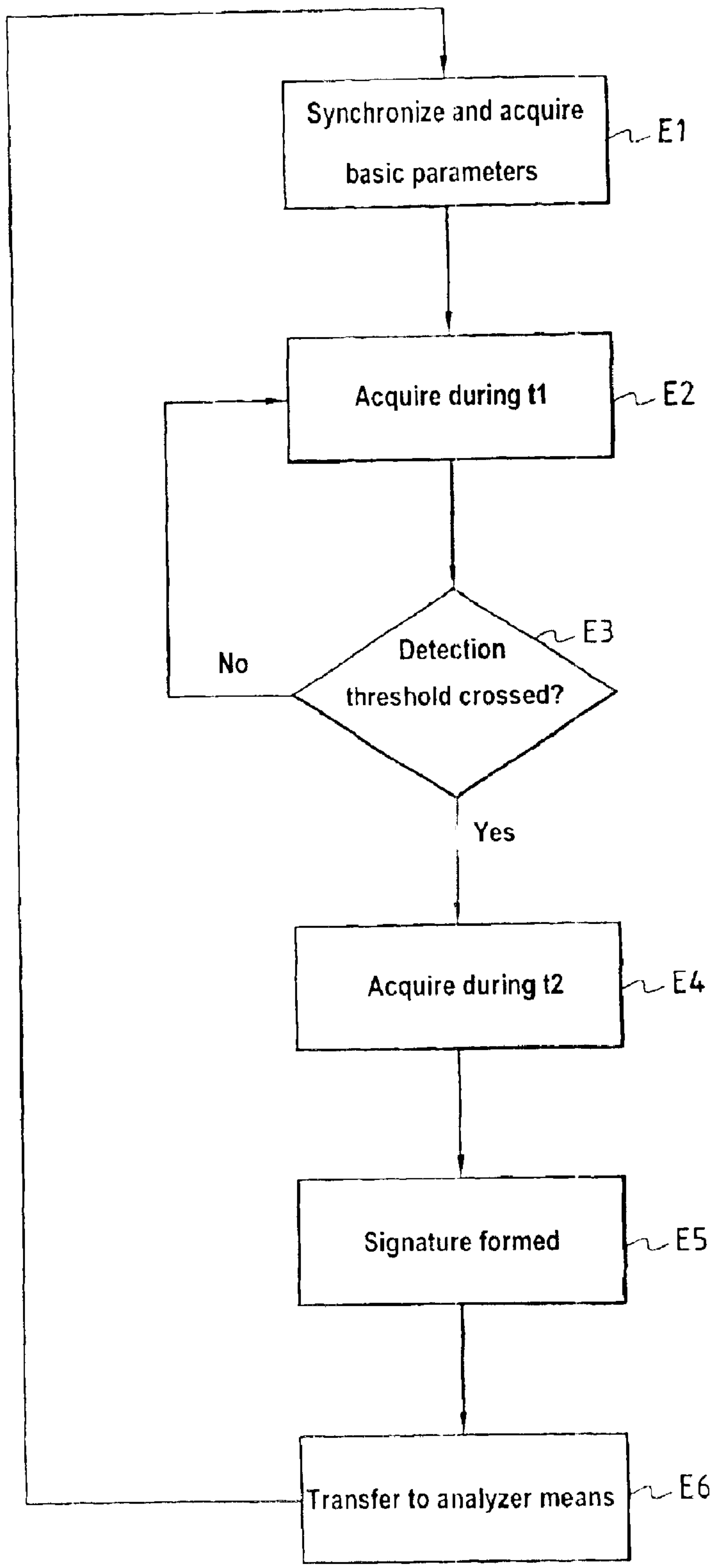
FIG. 5 shows an extractor method that can be used in the context of the present invention.

FIG. 5 shows one example of how the extraction and shaping means 20 work.

In this example, the coefficient FACT which is used to convert frequency variations into relative variations in L is defined as follows:

FACT=0.00965 for S (sensitivity)=0.04 to 0.64, and FACT=0.00244 for S=0.01 or S=0.02.

The main steps E1–E6 of this method are as follows:

In a first step E1, the timer 28 is synchronized to the real time clock 26 and the basic parameters are acquired.

In one example, the following data is acquired at this stage:

| | |
|---|---|
| Date: | Feb. 22, 2000 (22/02/00) |
| Time: | 08:52:45:26 |
| Timer: | 1 368 906 243 microseconds ($\mu$s) |
| Sensitivity setting: | 0.16 |
| Frequency: | 61,561 hertz (Hz) |
| Inductance: | 142.2 $\mu$H |

In a second step E2, data is acquired from the detector during a time period t1. Each sample of ΔL/L is calculated (for example from the above equation (1)) and stored in the buffer memory (circulating buffer) 30 with the corresponding value from the timer.

As already indicated above, the value of t1 depends on the response time TR of the detector used, for example t1=100 ms. Its optimum value is approximately 1.5×TR. The value of TR corresponds to the highest sensitivity setting, for example 0.01.

The next step E3 then tests if the detection threshold (which is set by manual adjustment of the detector) has been crossed. Else, the algorithm returns to step E2.

During the next step E4, data is acquired from the detector during a time period t2 which is equal to t1+tL, where tL is the passage time at a speed of 10 kph for the longest vehicle to be taken into account (for example: t2=7300 ms for an 18 m long vehicle, a 2 m detection area and t1=100 ms). Values of the ratio ΔL/L are then calculated (for example from the above equation (1)) and stored in the buffer memory 32.

Each sample ΔL/L is stored in the memory 32 with the corresponding value from the timer.

In the next step E5, the values in the buffer memories 30 and 32 are recovered to form a complete signature of the vehicle conforming to the time and date from the timer. The correspondence between the real time clock 26 and the timer 28 means that the passage of the vehicle can be time-stamped precisely.

In the final step E6, the signature data is formatted and transferred from the means 20 to the analyzer means 22.

The responses recovered and the individual measurements can then be transferred to the application for calculating speed, classifying into categories, etc.

The algorithm then returns to step E1.

Numerous variants can be envisaged, depending on the chosen hardware and software architecture. Thus the intelligence of the loop detectors can be increased, whilst still conforming to the above features, by incorporating a portion of the extractor means into them. The timer 28 (supplying values on four bytes) and the buffer memories 30 and 32 can beneficially be implemented on the same card as the detector 16, to improve the detector information transfer time and thereby increase the resolution of the signature.

The processing performed by the analysis and classification system can be transferred partly or wholly to the detector card or to an independent CPU card.

The invention is not limited to the single embodiment described herein by way of example because the components can be on physical media that are separate or not.

The timer 28 has accuracy of the order of one microsecond, for example.

In one embodiment, its accuracy can be adapted as a function of the duration of the signature signal.

A dynamic scale is used for this purpose, which economizes on memory space.

Figure 13:
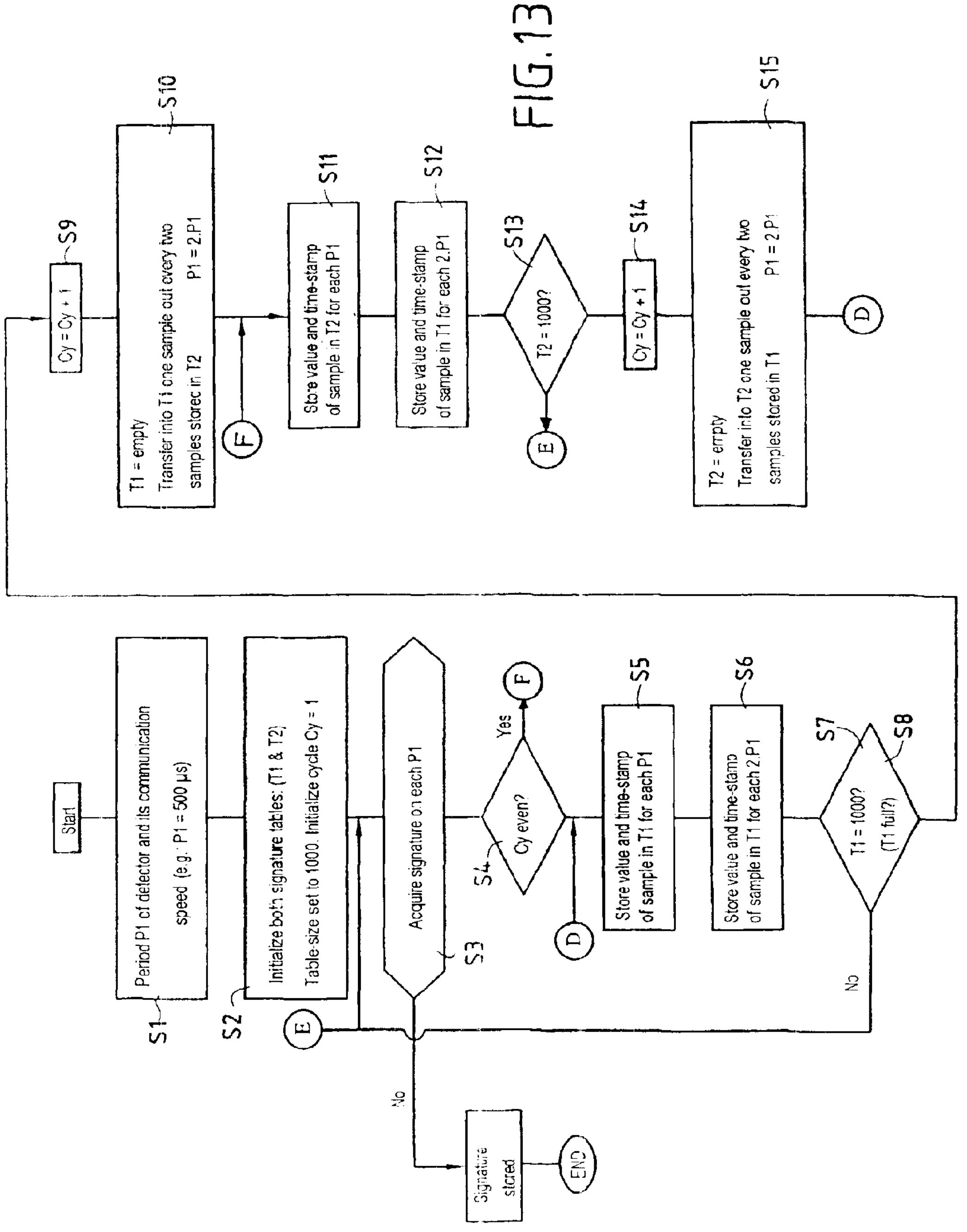
FIG. 13 shows an algorithm for adapting the signature acquisition scale.

Scale adaptation is explained with reference to FIG. 13.

The algorithm cyclically fills two tables $T_1$ and $T_2$ with signature data at two different speeds.

The speed at which the table $T_1$ is filled is first selected to be twice that at which the table $T_2$ is filled (steps $S_6$ and $S_7$).

When $T_1$ is filled (as tested in step $S_8$), $T_1$ is emptied and some of the values from $T_2$, which is itself half-full, are transferred into it (step $S_{10}$).

The speed at which $T_1$ is filled is then modified, the speed at which $T_2$ is filled remaining unchanged.

The process continues (steps $S_{11}$–$S_{15}$) until the acquisition of the signature has been completed (the test to find out if there is further signature data is effected in step $S_4$), and the filled table is then retained: regardless of the duration of the signature, the data table obtained is always exactly the same size (here its size is defined by N=1000). This means that the period between two successive values is adapted to suit the duration of the signal.

According to this aspect of the invention, the time intervals between measurement points can be adapted automatically to optimize the time scale as a function of the real duration of the digitized signal.

The electromagnetic signature supplied by the extractor means 20 therefore takes a digitized and sequenced form, i.e. a series of values of ΔL/L, each associated with a corresponding timer value, at constant time intervals.

Because each electromagnetic signature signal and each data point of the electromagnetic signature are sequenced and time-stamped in a synchronized manner, the passage of a vehicle can be time-stamped accurately or a time and date can be associated with each electromagnetic signature data point.

This means that the exact time and date at which each vehicle passes can be identified and in particular it is possible to identify precisely all the points or all the data of the signature, which is particularly advantageous for discriminating more than one vehicle passing simultaneously in multilane traffic, a vehicle straddling two adjacent sensors, and spurious detections. The methods and devices known in the art do not provide for such direct and such accurate identification.

In fact, in the invention, time-stamping is performed continuously or successively for each digitized data point from the start of the signature.

Figure 6A:
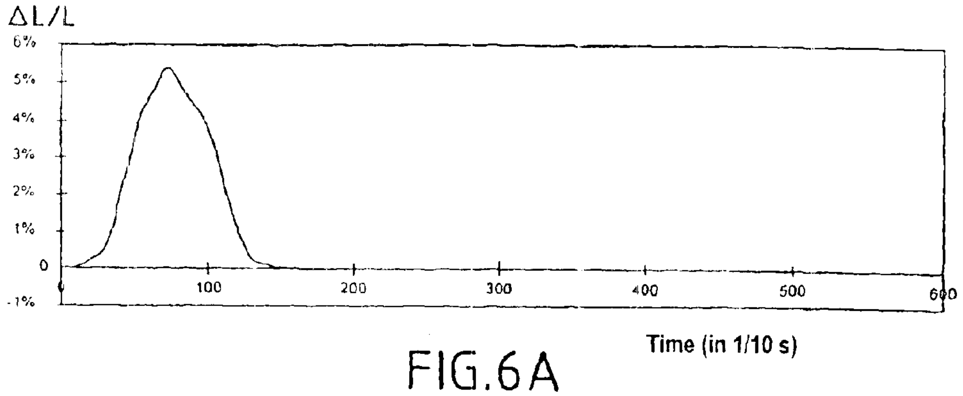
FIGS. 6A to 6C show various examples of electromagnetic signatures obtained with a device of the invention.
Figure 6B:
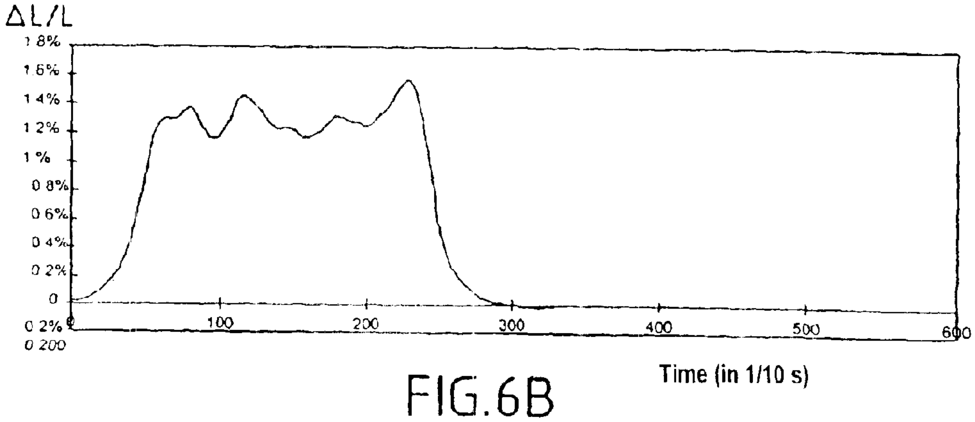
Figure 6C:
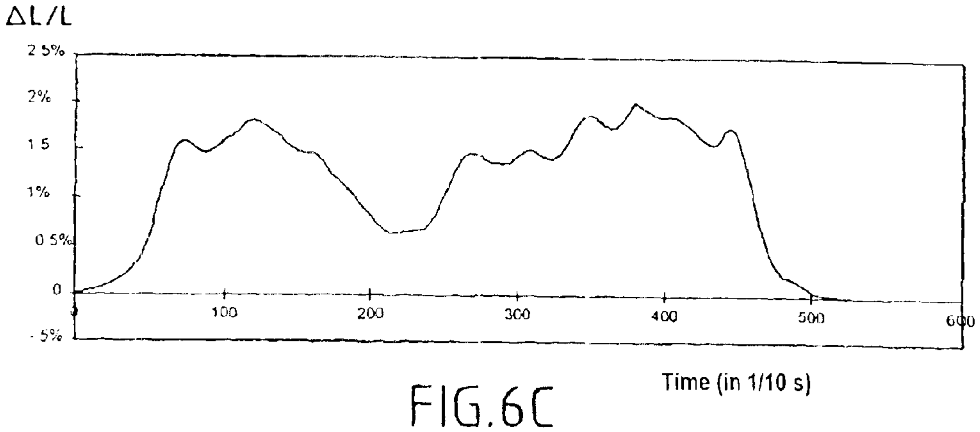

FIGS. 6A to 6C show examples of signatures:

FIG. 6A shows the electromagnetic signature of a light vehicle,

FIG. 6B shows the electromagnetic signature of a three-axle truck, and

FIG. 6C shows the electromagnetic signature of a semi-trailer truck.

In each case the ordinate axis represents ΔL/L and time is plotted on the abscissa axis in units of one tenth of a second.

The signatures are therefore shown with a particular time scale unit, but data is stored at a higher resolution, set by the timer 28, which determines the maximum precision of the system (which is of the order of one microsecond at most).

A classification method of the invention which can be implemented with the aid of the analyzer means 22 is based on working through a plurality of decision trees.

A decision tree is a set of tests organized so that a new object (signature) can be classified quickly. The tree comprises nodes and branches and each node consists of a test on a variable. The terminal nodes are the classification categories.

A tree of the above kind is a binary tree, i.e. it includes "if . . . then . . . else" tests so the progression is from node to node via the branches. When the node is a terminal node, it is a leaf whose content is the category of the object to be classified.

A tree is constructed from a training set containing the objects to be classified with an automatic classification generation or construction algorithm that aims to minimize the number of tests to be effected for the purposes of classification.

The basic principle of this algorithm is to start from a set of examples (the training database) to create a classification tree with the aim of minimizing the number of tests that need to be effected in order to classify a new object.

The test variable at each node is that which optimally separates the objects into two homogeneous subsets. The selection criterion used for achieving this optimum separation is based on Shannon entropy measurement. The separation operation is repeated until the subsets contain only individuals in the same category.

An algorithm of the above kind is described by J. R. QUILAN in "Learning efficient classification procedures and their application to chess end games" in "Machine Learning: an Artificial Intelligence Approach", Michalsky, Carbonell, Mitchell—pp. 463 to 482—Palo Alto—Calif., Tioga Publishing Company, 1983, and in a paper by the same author entitled "Induction Decision Trees" in "Machine Learning", Vol. 1, pp. 81 to 106, Kluwer Academic Publishers, 1986.

Figure 7:
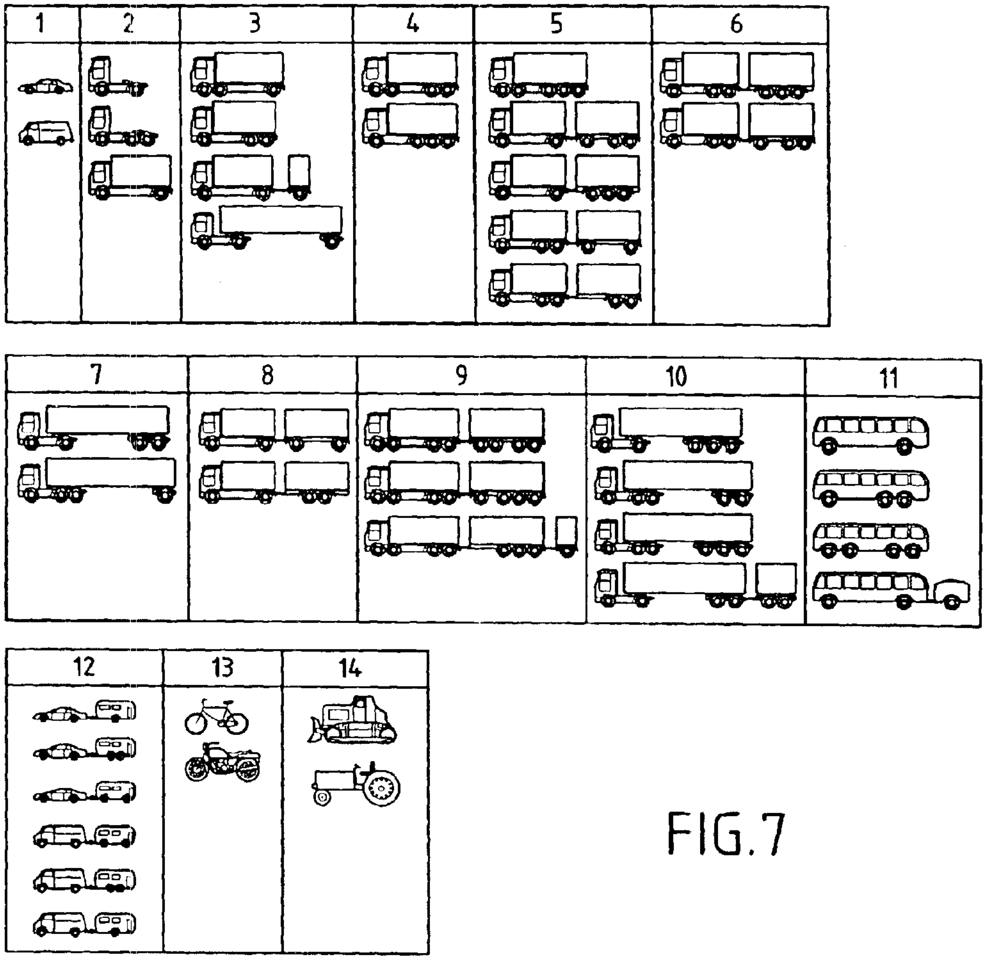
FIG. 7 is a diagram showing how vehicles are classified into 14 silhouette categories.

In one example, trees were constructed using an algorithm of the above kind and a learning base consisting of the signatures of more than 1000 vehicles totally identified by their respective silhouette categories. FIG. 7 shows the definition of the 14 categories used for this example:

category 1: light vehicles (saloons, coupes, vans, etc.),
category 2: small trucks or semi-trailer tractor units,
category 3: three-axle trucks with or without trailer,
category 4: four-axle trucks,
category 5: five-axle trucks with or without trailer,
category 6: six-axle trucks with trailer,
category 7: four-axle heavy trucks (with semi-trailer),
category 8: four-axle trucks with trailer,
category 9: eight-axle trucks with trailer,
category 10: five-axle or six-axle heavy trucks (with semi-trailer),
category 11: bus or coach with or without trailer,
category 12: light vehicles with caravan or trailer,
category 13: cycles or motorcycles,
category 14: civil engineering plant or farm machinery.

The objects, in this instance vehicles, are classified into the above categories by each tree as a function of their respective electromagnetic signatures.

Classifications with a number K of categories other than 14, for example K<14, can also be produced. In one example K=2, which corresponds to questions such as "is the vehicle of type C14 or not?" or "is the vehicle of type C1 or not?".

Prior to undertaking the process of producing a tree, each signature has been described by a set of time variables and frequency variables.

N time variables are considered and are in fact the values of the signature resulting from sampling (dividing) the signature into N (for example N=50) points.

The other variables contain information concerning the first harmonics, for example the first eight harmonics: amplitude, phase, harmonic content, and amplitude ratios. They are obtained after frequency analysis of the signature, for example using the Fourier transform.

The variables used for the description of an electromagnetic signature whose harmonics have the amplitudes A0 (fundamental), A1 ($1^{st}$ harmonic), . . . , Ai ($i^{th}$ harmonic) can therefore be:

firstly, the values of the signature resulting from sampling it into N (here N=50) points, in which case only the first 49 values are retained for processing, secondly, frequency variables, comprising:

- the amplitude and phase of the first eight harmonics of each signature, constituting 16 variables, and
- the amplitude ratios between the various harmonics (A0/A1, A0/A2, A0/A3, . . . , A0/A7, A1/A2, A1/A3, . . . , A1/A7, A2/A3, . . . , A2/A7, A3/A4, . . . , A3/A7, A4/A5, . . . , A4/A7, A5/A6, A5/A7, A6/A7), constituting 28 variables, and
- the following seven harmonic richness ratios: (A1+A2+A3+A4+A5+A6+A7)/A0, (A2+A3+A4+A5+A6+A7)/A1, (A3+A4+A5+A6+A7)/A2, (A4+A5+A6+A7)/A3, (A5+A6+A7)/A4, (A6+A7)/A5, (A7/A6).

There are therefore 51 frequency variables. In fact there are only 50 independent variables, since the harmonic richness ratio A7/A6 is merely the reciprocal of the ratio A6/A7 already included in the 28 amplitude ratio variables.

The automatic classification generation algorithm uses the above variables to produce decision trees.

In the invention, each tree is obtained from a random selection of variables characteristic of the electromagnetic signatures. Producing a set of trees of the above kind ends up by providing a reliable classification method yielding a deterministic classification result.

Thus only n variables are taken into account, with n<100 (for example: n=30), drawn at random from all of the variables associated with each of the original signatures.

To effect this random selection, an identifier from 1 to 100 is associated at random with each variable and only variables drawn at random and whose identifier is less than n are retained.

Because of this procedure, the number of variables chosen can be slightly different from n.

The variables retained are introduced into the automatic classification generation algorithm in order for it to produce a first decision tree for carrying out a predetermined sort, i.e. to answer the question "is the vehicle of type Cil or . . . or of type Cip (p>1)?", where Cip represents the p classes or categories chosen from the original K categories in the set containing all the vehicles.

Then new variables are drawn at random to construct a second tree and perform the same type of sort.

The above procedure is repeated until k decision trees are obtained, with each tree constructed from a set of variables drawn at random from the original variables. A value of k=10 is suitable, but other values of k (for example k>5) may be also be suitable in some cases.

In operation, and thus to classify a new object, in this instance a signature, the k trees are worked through in parallel. The classification decision chosen is the category with the highest occurrence after working through the trees. When there is equality, i.e. when two classes Ci and Cj contain five responses, the one with the lower index i or j is retained.

There are relatively marked differences within the same category of vehicles. Also, the vehicle signatures are sometimes distorted, in particular if the vehicle does not travel along the axis of the sensor. All these factors degrade the results, but the ratio of vehicles classified correctly is improved if a preliminary short vehicle/long vehicle sort is carried out, with the sorting strategy still based on working through multiple trees.

Figure 8:
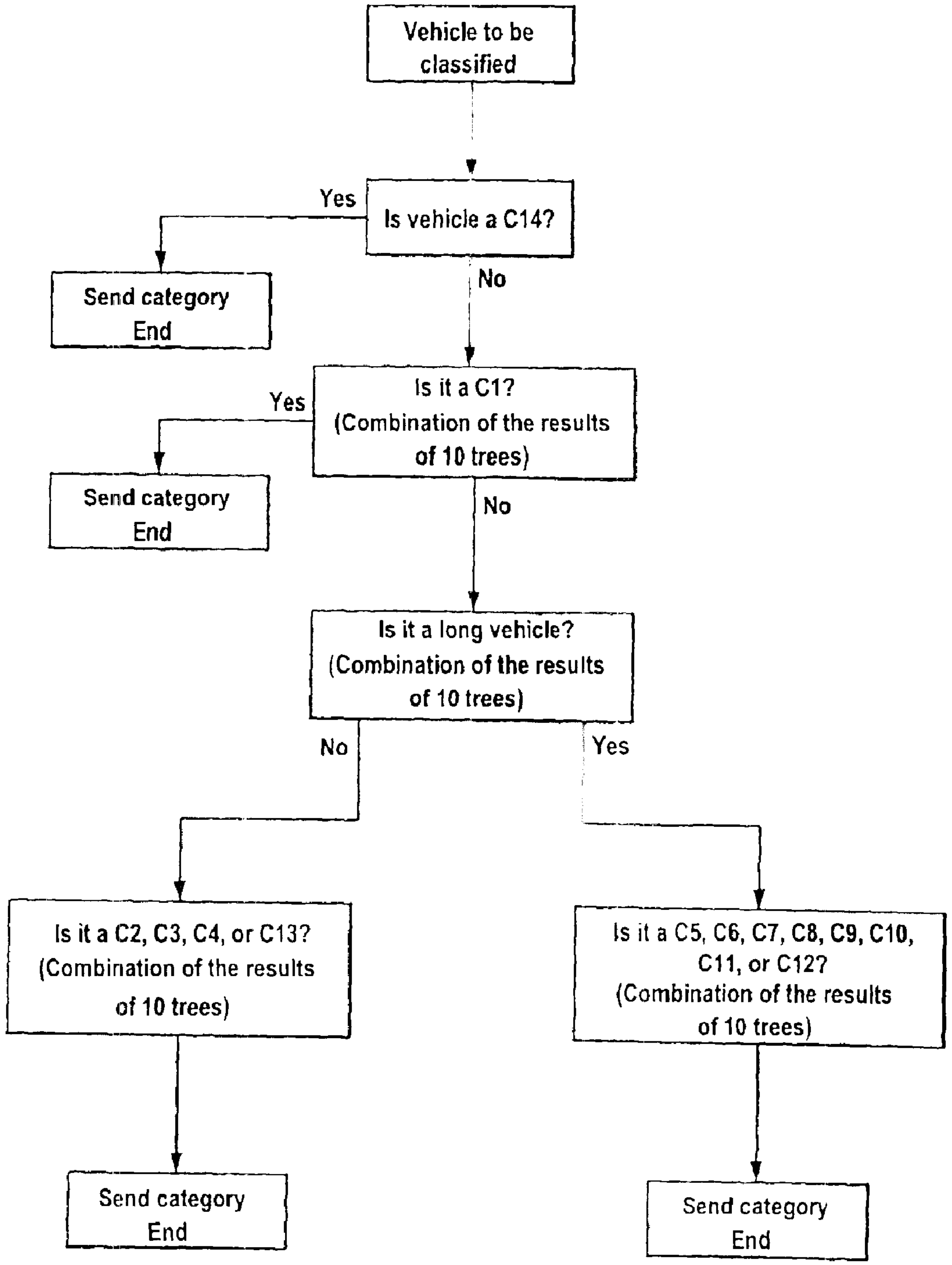
FIG. 8 is a classification flowchart.

For the example already given of classification into 14 categories, the classification method or structure for working through the trees for classifying a vehicle is that shown in FIG. 8.

This method is implemented with the aid of the analyzer means 22 and using the following algorithm:

```
START
Number of C1 = 0
WHILE   number of C1 is less than 500:
            Recover table of signature values,
            Calculate variables (Resample signature for
            normalization to 50 time points, Calculate frequency
            variables),
            Seek category of vehicle,
            IF category = 14,
            THEN return 14,
            ELSE work through 10 trees for sorting C1 in
            parallel,
                    IF category = C1
                    THEN save max amplitude of vehicle
                            no. of C1 = no. of C1 + 1
                            return 1
                    ELSE work through 10 trees for sorting long
                    vehicles in parallel.
                            IF long vehicle
                            THEN work through sorting of long
                            vehicles in parallel
                            return vehicle category (5, 6, 7,
                            8, 9, 10, 11, 12)
                            ELSE work through sorting of short
                            vehicles in parallel
                            return vehicle category (2, 3, 4, 13)
                            END IF
                    END IF
        END IF
        calculate speed
        return speed
END WHILE
Go to START
END
```

After sampling the signature and calculating the frequency variables, the method first applies a test to determine if the vehicle is of type C14 or not.

If it is not of category C14, a test (the result of combining 10 trees) determines if the vehicle is of category C1 or not.

If it is not of category C1, another test (again the result of combining 10 trees) determines if the vehicle is a long vehicle or not.

If the vehicle is a long vehicle, a test (again the result of combining 10 trees) determines the category C5 to C12 of the vehicle.

If the vehicle is not a long vehicle, a test (again the result of combining 10 trees) determines the category C2, C3, C4 or C13 of the vehicle.

Consequently, depending on the vehicle category:

no tree is worked through for a type C14 vehicle, 10 trees are worked through for a type C1 vehicle, or 30 trees are worked through for other vehicles.

The frequency variables are calculated after spectrum analysis using the Fourier transform.

This method can be adapted for a classification into K categories where K has a value other than 14.

The signature of a vehicle, as measured at the sensor, is introduced into the classification algorithm or method with a format imposed by the processor means 20, 22 (for example: in the form of tables of values whose number in the case of long vehicles is from 500 to 1000). These values are representative of the relative inductance variation ($\Delta L/L$) at constant and regular time intervals. They are expressed in multiples of $10^{-5}$, for example. The sampling period is expressed in microseconds; for the estimate of the speed to be sufficiently accurate for vehicles traveling at more than 100 kph the sampling period is 0.6 ms, for example.

The algorithm that has been developed is adapted to operate in association with an electromagnetic loop sensor whose function is to produce the signature of the vehicle.

The algorithm can also be a self-adapting algorithm.

Even for a given geometry, the response of the sensors is not independent of the site, in particular because the length of the loop return cable 12 (see FIG. 2) depends on local installation conditions. The resulting effect, which is more or less linear, except for extreme cases, is reflected in a geometrical similarity transformation of the signature.

Consequently, during an initial phase, the algorithm can determine the site correction to be applied. This phase involves only discriminating between category C1 (light) vehicles and other vehicles. It ends as soon as 100 C1 vehicles have been identified.

In the next phase, called the exploitation phase, all the vehicles are classified. Their speed can also be estimated, using the sequenced and digitized data, and the site correction can be validated each time a specified number of vehicles has been detected, for example 500 category C1 vehicles, which allows any drift effects to be taken into account.

The string of tasks executed in the initial phase is then as follows:

```
START
Number of C1 = 0
WHILE number of C1 is less than 100:
        Recover table of signature values,
        Seek maximum amplitude,
        Normalize amplitude relative to maximum,
        Calculate variables (Resample signature for
        normalization to 50 time points, Calculate frequency
        variables),
        Seek vehicle category (work in parallel through 3
        specific decision trees for sampling),
        IF category = C1
        THEN    save max amplitude of vehicle,
                return 15,
                number of C1 = number of C1 + 1,
        ELSE return 16,
        END IF
END WHILE
        Calculate site factor (average of max amplitudes of C1
        after eliminating extreme values)
        END (End of initial phase)
```

The codes 15 and 16 respectively indicate the category C1 with an uncertainty and the "long vehicle" category, also with an uncertainty.

In this case it is possible to modify in the following manner the start and the end of the above classification algorithm:

```
START
Number of C1 = 0
WHILE number of C1 is less than 500:
        Recover table of values of signature,
        Apply site factor,
        Calculate variables (Resample signature for
        normalization to 50 time points, Calculate
        frequency variables),
...
...
END WHILE
Calculate new site factor (average of max amplitudes of
C1 after eliminating extreme values),
Replace site factor with new site factor,
Go to START,
END
```

Drift can occur in the parameters influencing the site factor, and in this way the site factor to be taken into account can be updated.

It must be noted that the decision trees implanted in the code were obtained for a particular sensor geometry (1.5 m×2 m loop). Other trees can be adapted to suit different configurations.

Estimating vehicle speeds is optional.

The sorting trees are obtained by means of a microcomputer, such as the microcomputer 21, programmed to execute an algorithm like the J. R. QUILAN algorithm already mentioned hereinabove.

Figure 9:
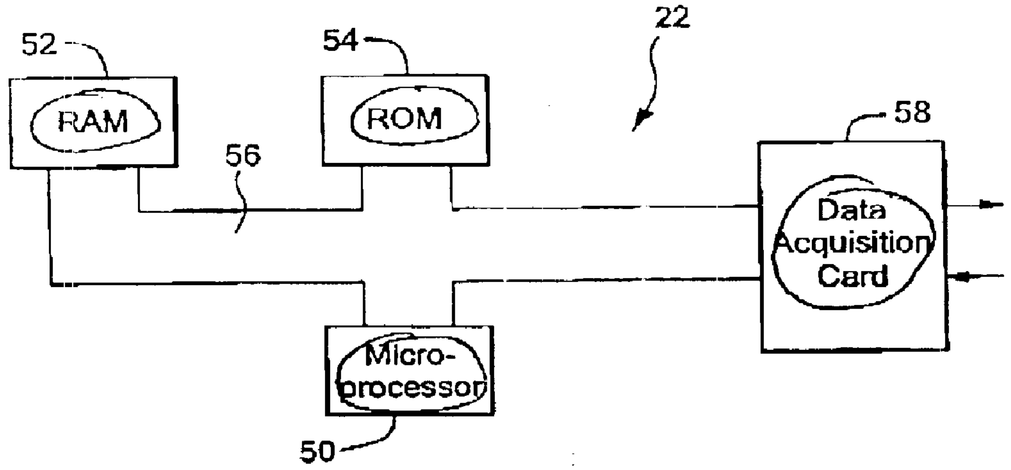
FIG. 9 shows processor means of a device of the invention, FIGS. 10A and 10B respectively show the use of a device of the invention on two lanes with only one sensor in each lane and a prior art device with two sensors in each lane.

The microcomputer has a structure similar to that of FIG. 9. The time and frequency variables are obtained from digital signature signals produced and transmitted over the link 19 by the card 20.

Each test tree is obtained in the form of a program whose instructions are stored in a memory area of the microcomputer 21. The sorting algorithm, such as that from FIG. 8, can then be executed by an operator invoking these programs.

The sorting method of the invention operates almost in real time. The response time depends essentially on the processor and is faster than 50 ms with a 133 MHz Pentium® processor.

As to classification performance, this is entirely comparable with existing systems. Results obtained at three different sites, each time for a sample of approximately 1000 vehicles of which 750 were non-C1 vehicles, are set out in Table I below. The results for each category are expressed as a percentage correctly classified (CC%).

TABLE I

| Cat | C1 | C2 | C3 | C4 | C5 | C6 | C7 | C8 | C9 | C10 | C11 | C12 | C13 | C14 |
|---|---|---|---|---|---|---|---|---|---|---|---|---|---|---|
| CC % | 97 | 80 | 60 | — | 40 | 10 | 70 | 60 | — | 70 | 90 | 90 | 100 | 50 |

The signature curves produced are exponential, at least in a first portion.

Speed is calculated by a particular process that looks for the moment at which the trend of the signature ceases to follow an exponential relationship. The time that has elapsed between the start of the signature and this moment is inversely proportional to the speed of the vehicle.

FIG. 9 is a block diagram of the means (programmed CPU card) 22 which implement in particular the sorting methods described hereinabove, the Fourier transform processing, and the extraction of the variables for each signature.

The means 22 include a microprocessor 50, random access memories (RAM) 52 for storing data, and a read-only memory (ROM) 54 for storing program instructions.

A data acquisition (input/output interface) card 58 formats the digitized and sequenced data supplied by the card 20 to the required format.

The above components are connected to a bus 56.

Data or instructions for processing data in accordance with the invention (spectrum analysis, extraction of variables for each signature, sorting process) are loaded into the means 22 and in particular into the memory 54.

The data or instructions for processing data can be transferred into the memory area 54 from a diskette or any other medium that can be read by a microcomputer or computer (for example: hard disc, read-only memory (ROM), dynamic random access memory (DRAM) or any other type of random access memory (RAM), optical compact disc, magnetic or optical storage element).

The data obtained by sorting can also be shown on display means such as the screen 23 of a microcomputer 21. An operator can then process the data using a keyboard 25, a mouse 27 and any program resident in the microcomputer 21. Vehicle counting information for each category of vehicle can therefore be obtained after classification, for example.

The results may appear insufficient for some categories. This may be because the test sample is insufficient. There are vehicles which are rarely encountered. However, it is also because the same vehicle may travel sometimes on all its axles and at other times with an axle raised. This means that the vehicle can belong to two categories, depending on whether or not it has an axle raised.

If a new classification is defined in which similar vehicles are placed in the same category (for example C7 and C10 semi-trailer vehicles), then the results obtained are very satisfactory, as can be seen in Table II.

TABLE II

| Cat | C1 | C2 + C3 + C4 | C5 + C6 + C8 | C7 + C10 | C11 | C12 | C13 | C14 |
|---|---|---|---|---|---|---|---|---|
| CC % | 97 | 96 | 94 | 91 | 95 | 90 | 100 | 50 |

Figure 10A:
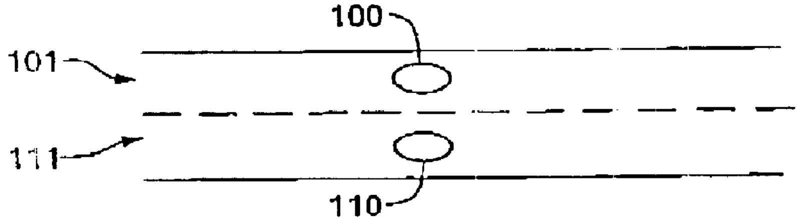
Figure 10B:
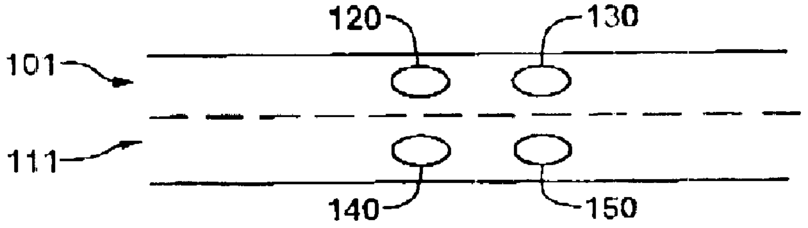
FIG.10B PRIOR ART

FIGS. 10A and 10B respectively show the use of a device of the invention on two lanes with a single sensor in each lane and a prior art device with two sensors in each lane.

In FIG. 10A (the device of the invention), the data acquisition system for each sensor is of the type described hereinabove with reference to FIGS. 3 and 4 and uses the method described with reference to FIG. 5. Time-stamping and synchronization are the same for both loops or sensors. From the practical point of view, there is a single electronic circuit card for both sensors, integrating the parallel acquisition systems for the sensors. This remains valid for n sensors when n>2, for example n=3 or 4.

In both cases (FIGS. 10A and 10B), a vehicle may straddle both lanes.

In FIG. 10A, time-stamping synchronized with sequencing in real time can distinguish between a single vehicle straddling both lanes and two vehicles each in one lane.

Figure 11A:
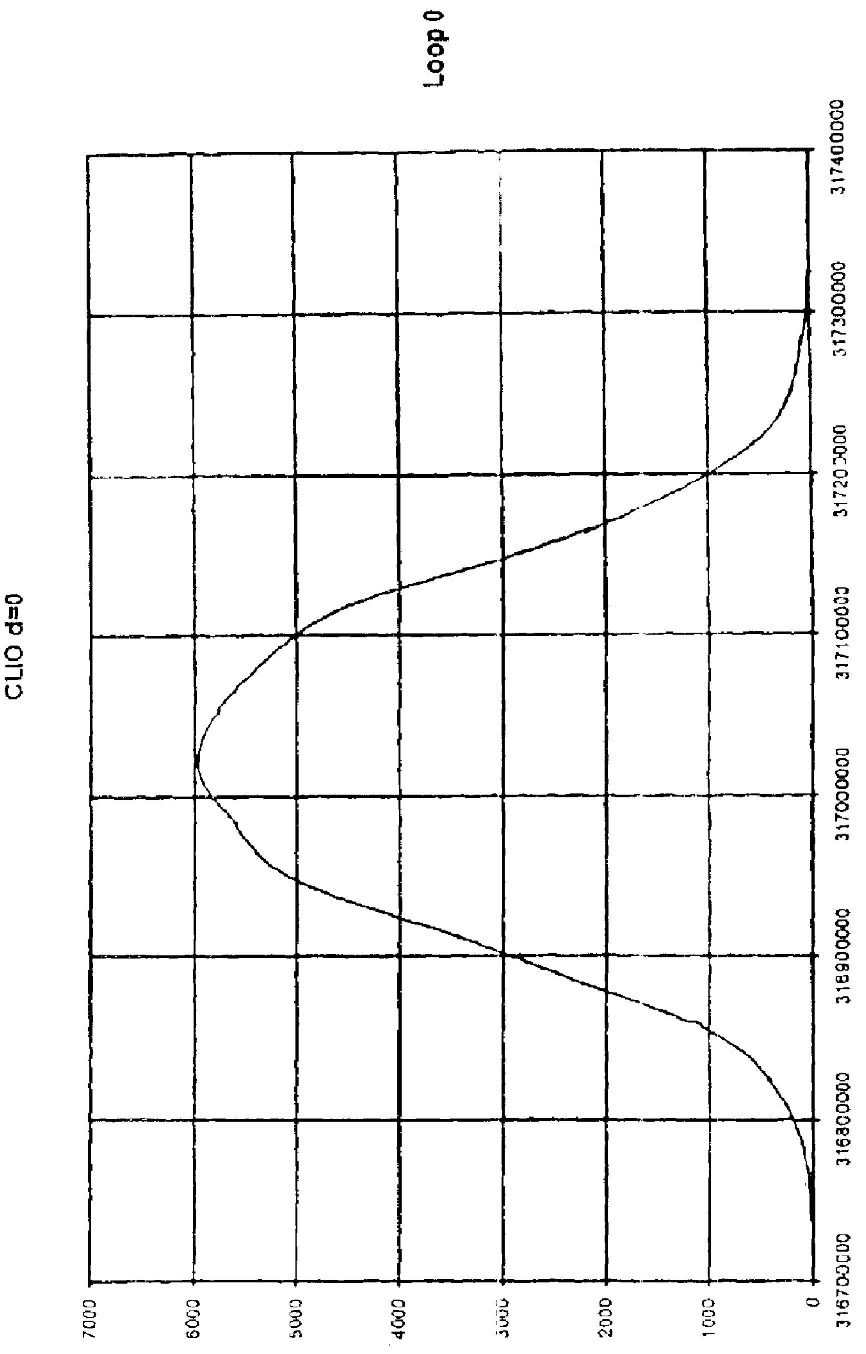
FIGS. 11A to 11C show examples of signatures for various positions of a vehicle relative to one or two loops.

FIG. 11A shows a vehicle passing over the center of a single loop.

Figure 11B:
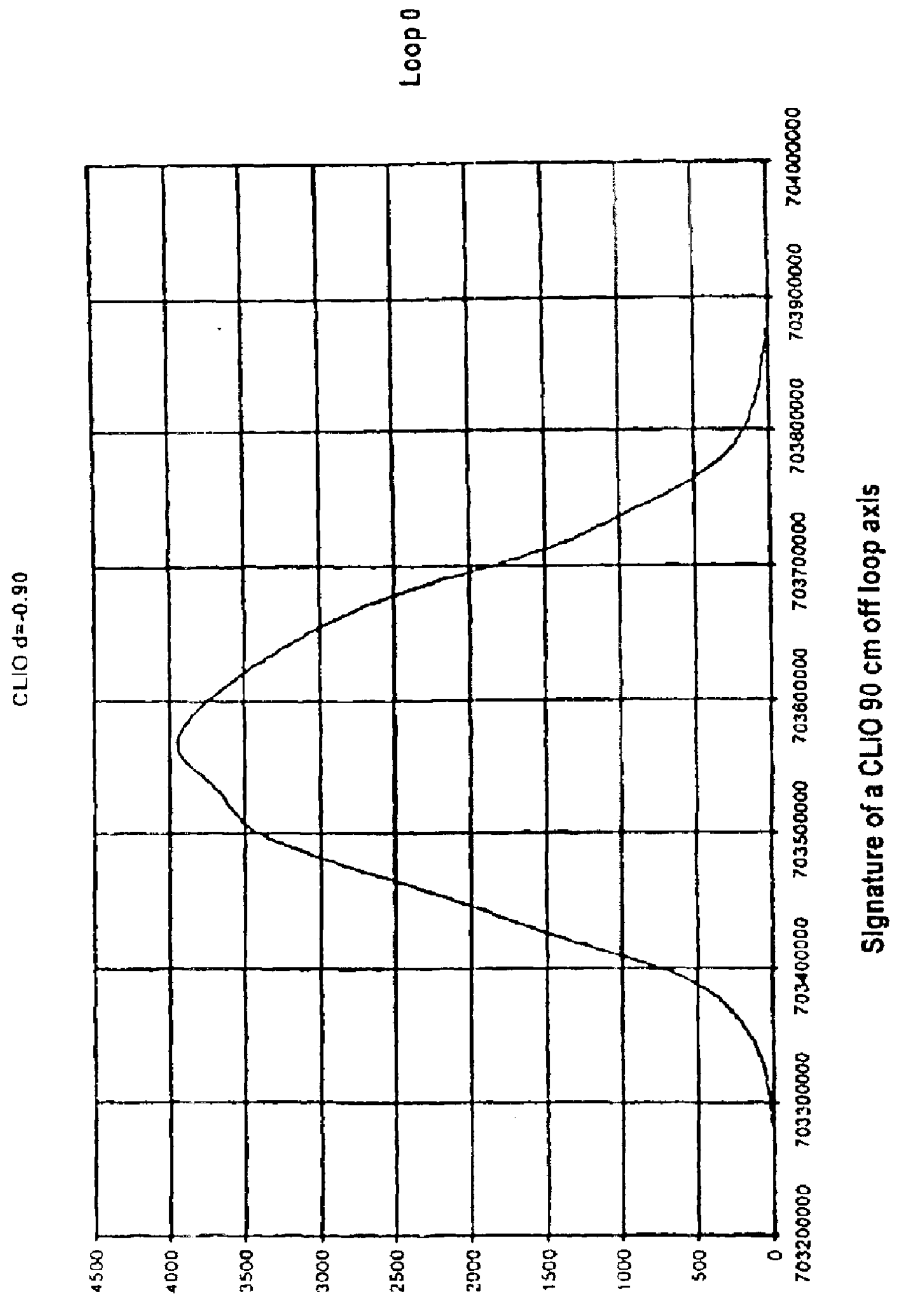

FIG. 11B shows a vehicle passing over a point offset from the axis of a single loop.

Figure 11C:
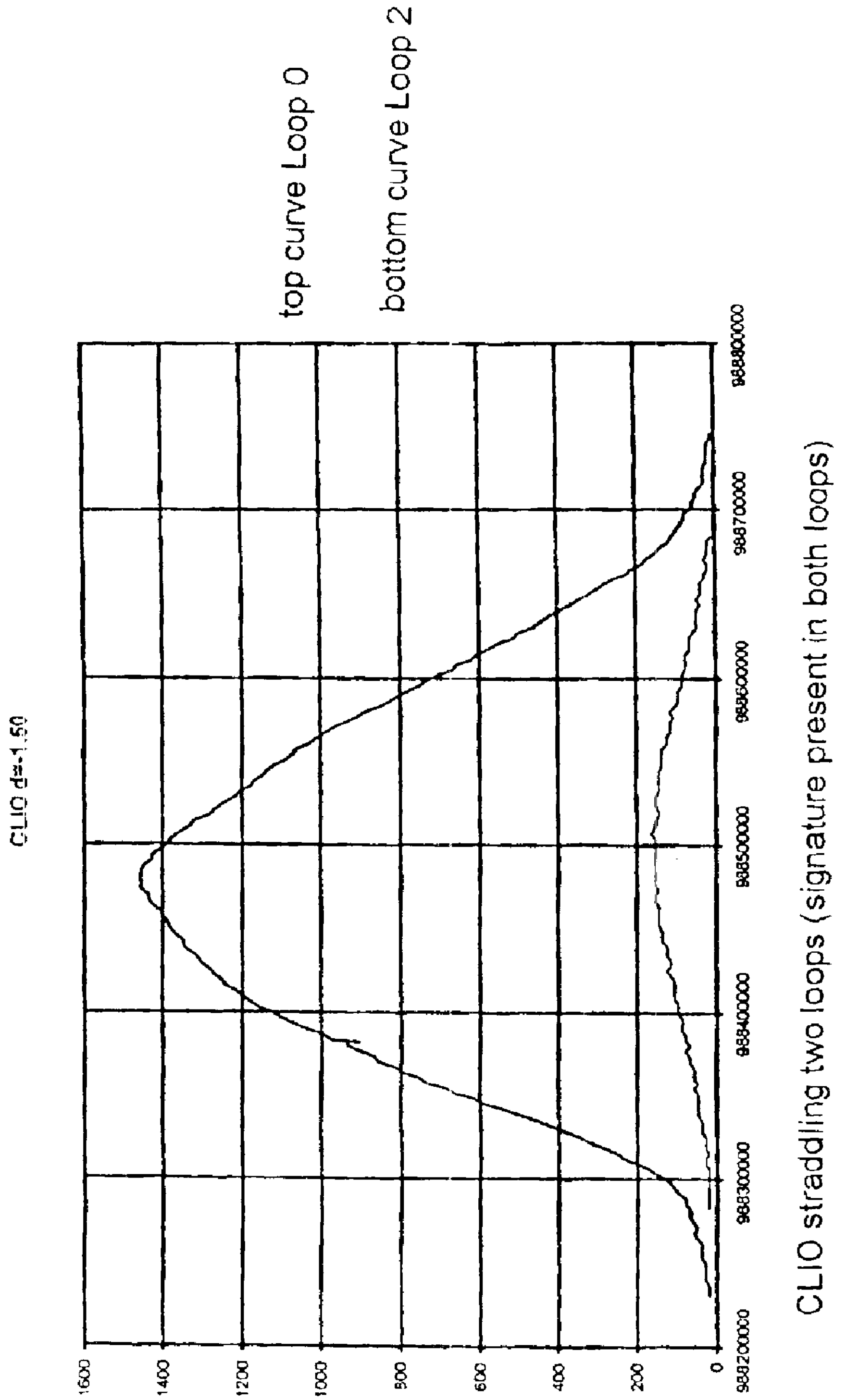

FIG. 11C shows a vehicle straddling two loops disposed as in FIG. 10A, and shows that the signature is highly imbalanced between the two loops.

In the case of two vehicles close together in the two lanes, different signatures of comparable intensity are identified sufficiently accurately.

In the conventional systems from FIG. 10B, a specialist processing algorithm is used to discriminate between these two situations, the performance of the algorithm being very restricted in any case because of the absence of synchronized time-stamping.

Figure 12:
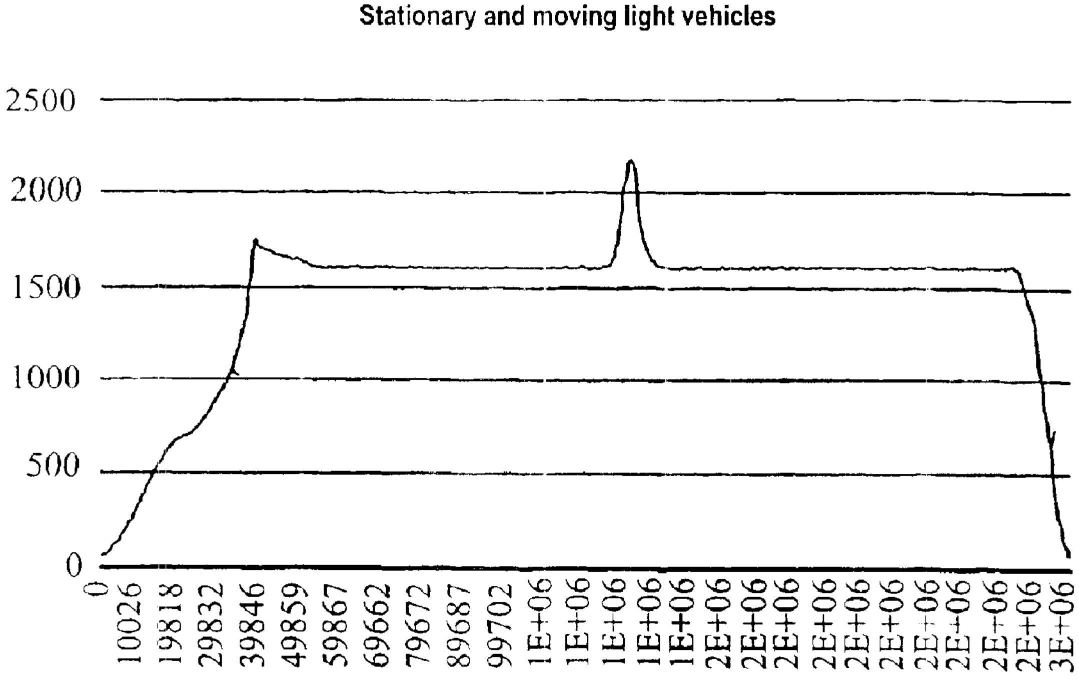
FIG. 12 shows a signature of a moving vehicle superimposed on a signature of a stationary vehicle.

FIG. 12 shows the signature of a vehicle that is stationary over a single loop on which is superimposed a spike corresponding to the signature of a vehicle that passes without stopping.

The spike can be isolated from the remainder of the signal using a difference method. It is then possible to work on the spike, and thus on the signature of the moving vehicle, in exactly the same way as on any other signature.

A system of the invention with a single loop can therefore discriminate between a stationary vehicle and a moving vehicle.

What is claimed is:

1. A signal processing device for obtaining vehicle electromagnetic signature data from electromagnetic signals from at least one roadbed electromagnetic loop, the device comprising:

means for obtaining a digitized signal from the electromagnetic signals, means for determining if a digitized signal is a vehicle electromagnetic signature signal, and means for calculating electromagnetic signature data of a vehicle from the digitized signal, and for sequencing and time-stamping each electromagnetic signature data point in synchronized and real-time manner.

2. A device according to claim 1, wherein the means for determining if a digitized signal is a vehicle electromagnetic signature signal include means for storing the digital data of each signal during a predetermined time period (t1) and means for comparing the stored data with a threshold value.

3. A device according to claim 1, wherein the means for time-stamping each vehicle electromagnetic signature data point include clock means and/or timer means.

4. A device according to claim 1, wherein the electromagnetic signals are frequency, phase, amplitude, or impedance variation signals.

5. A device according to claim 1, including an oscillator and means for producing electromagnetic signals representative of oscillator frequency variations and from which the vehicle electromagnetic signature data are produced.

6. A device according to claim 1, further including means for adapting the time interval between signature data points as a function of the real duration of the electromagnetic signature signal.

7. A signal processing device or a data acquisition system according to claim 1, further comprising classification means for classifying vehicles into two or more categories (C1, . . . , C14) of silhouettes as a function of the digitized electromagnetic signals.

8. A device according to claim 7, wherein the classification means process the digitized electromagnetic signature signals using a plurality of decision trees.

9. A device according to claim 8, wherein the classification means sample each electromagnetic signature signal beforehand and produce a set of digitized data and data characteristic of a number of harmonics of the electromagnetic signature signal.

10. A device according to claim 9, wherein the data characteristic of harmonics of the electromagnetic signature signal includes amplitude, phase, harmonic content, and harmonic amplitude ratio data for the electromagnetic signature signal.

11. A device according to claim 7, wherein the classification means can also classify vehicles into long vehicles and short vehicles.

12. A device according to claim 1, further including means for calculating the speed of a vehicle.

13. A method of processing vehicle electromagnetic signature signals, the method comprising:

obtaining the electric magnetic signature signals from a roadbed electromagnetic loop, digitizing, sequencing and time-stamping the electromagnetic signature signals in a synchronized manner and in real time, and classifying vehicles into two or more silhouette categories (C1, . . . , C14) as a function of the vehicles' respective digitized, sequenced and time-stamped electromagnetic signatures.

14. A method according to claim 13, wherein vehicles are classified with the aid of a shape classification algorithm or method including a plurality of decision trees.

15. A method according to claim 14, wherein the electromagnetic signature signals are sampled and subjected to harmonic analysis processing to determine therefrom data representative of some of their spectral components.

16. A method according to claim 13, wherein the vehicles are classified into 14 categories.

17. A method according to claim 13, wherein classification includes a step of classification into two categories, namely a long vehicle category and a short vehicle category.

18. A method according to claim 13, wherein the speed of the vehicles is estimated from the digitized signature data.

19. A method of generating a program for classifying vehicles into two or more predetermined silhouette categories as a function of signals representative of electromagnetic signatures of the vehicles, the method comprising:

processing the signals in the time domain to produce a first set of digitized data, processing the signals in the frequency domain to produce a second state of data containing the signal harmonic characteristics, making a first random selection of n data points from the data of the first and second sets, generating a first decision tree for classifying the vehicles into said predetermined categories as a function of the n data points obtained in the first random selection of data, making one or more second random selections of n data points from the data points of the first and second sets, and generating one or more second decision trees for classifying the vehicles into said predetermined categories as a function of the n data points obtained during the second random selection of data.

20. A method according to claim 19, wherein the signals representative of electromagnetic signatures are digitized signals.

21. A method of acquiring vehicle electromagnetic signature data on a road having two adjacent lanes using:

an electromagnetic loop (10) in each lane, and a device according to any one of claims 1 to 6.

22. A method according to claim 21, wherein vehicles straddling both lanes are identified.

23. A method according to claim 21, wherein the electromagnetic signals are frequency, phase, amplitude, or impedance variation signals.

24. A method according to claim 21, the road has two lanes, and wherein vehicles straddling both lanes are identified.

25. A method according to claim 21, wherein moving vehicle signature data is also acquired superposed on a signature of a stationary vehicle.

26. A device according to claim 2, wherein:

the means for time-stamping each vehicle electromagnetic signature data point include clock means and/or timer means;

the electromagnetic signals are frequency, phase, amplitude, or impedance variation signals;

further including means for adapting the time interval between signature data points as a function of the real duration of the electromagnetic signature signal.

27. A system for acquiring vehicle electromagnetic signature data, the system comprising:

a single electromagnetic loop, and a device according to claim 26.

28. A signal processing device or a data acquisition system according to claim 26, further comprising classification means for classifying vehicles into two or more categories (C1, . . . , C14) of silhouettes as a function of the digitized electromagnetic signals.

29. A signal processing device or a data acquisition system according to claim 27, further comprising classification means for classifying vehicles into two or more categories (C1, . . . , C14) of silhouettes as a function of the digitized electromagnetic signals.

30. A device according to claim 10, wherein the classification means can also classify vehicles into long vehicles and short vehicles.

31. A device according to claim 27, further including means for calculating the speed of a vehicle.

32. A device according to claim 28, further including means for calculating the speed of a vehicle.

33. A device according to claim 29, further including means for calculating the speed of a vehicle.

34. A device according to claim 30, further including means for calculating the speed of a vehicle.

35. A method according to claim 15, wherein:

the vehicles are classified into 14 categories;

classification includes a step of classification into two categories, namely a long vehicle category and a short vehicle category;

the speed of the vehicles is estimated from the digitized signature data.

36. A method according to claim 22, wherein:

the electromagnetic signals are frequency, phase, amplitude, or impedance variation signals;

the road has two lanes, and wherein vehicles straddling both lanes are identified;

moving vehicle signature data is also acquired superposed on a signature of a stationary vehicle;

the signature data for moving vehicles is isolated from the signature data for stationary vehicles.

* * * * *